United States Patent

[11] 3,601,797

| [72] | Inventor | Robert H. O'Connor |
| | | 1777 E. 48th St., Brooklyn, N.Y. 11234 |
| [21] | Appl. No. | 782,324 |
| [22] | Filed | Dec. 9, 1968 |
| [45] | Patented | Aug. 24, 1971 |

[54] ILLUMINATED DISTRESS SIGNAL DEVICE
9 Claims, 4 Drawing Figs.

[52] U.S. Cl. ............................................. 340/87, 340/84, 340/90
[51] Int. Cl. ............................................. B60q 1/00
[50] Field of Search .................................... 340/84, 87, 90

[56] References Cited
UNITED STATES PATENTS

| 1,489,334 | 4/1924 | Sandbrook | 340/84 |
| 3,197,628 | 7/1965 | Schuff | 340/87 UX |

*Primary Examiner*—John W. Caldwell
*Assistant Examiner*—Michael Slobasky
*Attorney*—Kenyon, Kenyon, Reilly, Carr and Chapin ABSTRACT: A balloon is mounted on a base through which the balloon can be inflated orally. In addition, a light is mounted within the base which can be plugged into a dashboard outlet of an automobile or to a battery of an automobile, boat or disabled aircraft in order to illuminate the balloon from within. The balloon can be deflated through a manually applied mechanism, such as a pin.

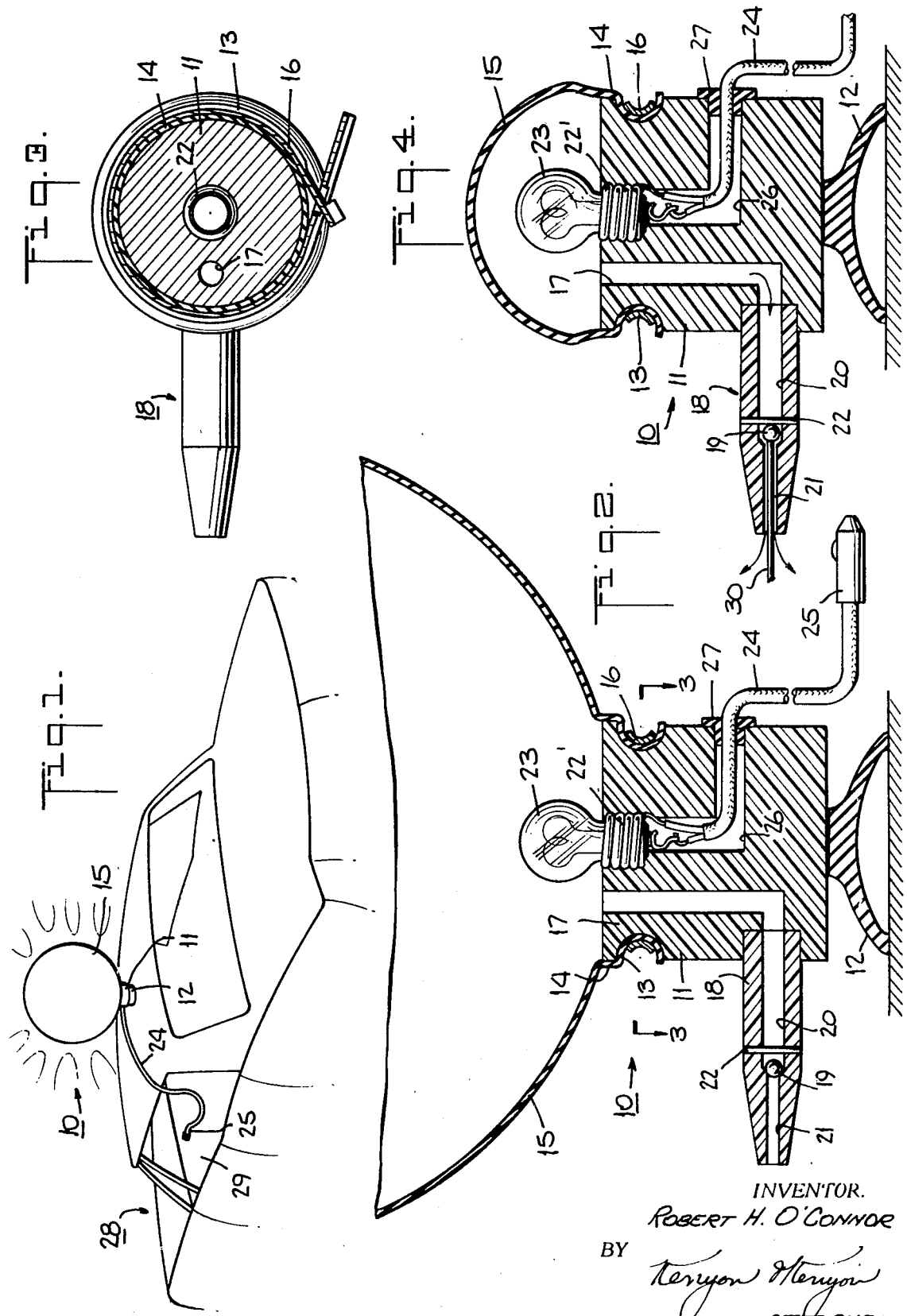

ILLUMINATED DISTRESS SIGNAL DEVICE

This invention relates to a distress signal apparatus. More particularly, this invention relates to an illuminated distress signal apparatus for use on automobiles, boats, aircraft and the like.

Heretofore, many different types of devices have been used by motorists for purposes of indicating a situation of distress or emergency signal. For example, in order for an automobile motorist to indicate an emergency condition, it has been customary to display a flag or handkerchief from the automobile in order to indicate to passing motorists a condition of distress. However, this type of signalling does not convey to a passing motorist the type of distress which has arisen nor has such a signalling technique been effective during night time hours. In other instances, for example, for downed aircraft, life rafts and boats, various types of distress signal devices have been used wherein a light is used as a beacon signal. In some instances, a balloon has been attached to a mooring on the aircraft or boat and has been allowed to float upwardly to an elevation above the disabled aircraft or boat while supporting an illuminating light or flare thereon. However, as above, the distress signal does not indicate the type of emergency condition which has arisen, for example, an injury to a passenger, lack of fuel, lack of food and the like. Furthermore, the various distress signal devices which have been utilized have been relatively expensive to manufacture and to manipulate into a condition of use.

Accordingly, it is an object of this invention to provide a distress signal device which is capable of indicating different types of emergency conditions.

It is another object of the invention to provide a distress signal device which is useful in nighttime conditions.

It is another object of the invention to provide a distress signal device which is easily handled manually.

It is another object of the invention to provide a distress signal device which is relatively inexpensive to manufacture.

It is another object of the invention to provide an emergency distress signal device which is easily stored in a minimum of space.

Briefly, the invention provides an illuminated distress signal device which utilizes different colored balloons and an internal light source within the balloon. The distress signal device includes a base of inexpensive material over which a balloon is mounted in a deflated condition. The base is provided with a suitable bore which communicates the interior of the base with the interior of the balloon as well as with a mouthpiece which is inserted into the bore so that the balloon can be inflated orally. In addition, the mouthpiece includes a valve means, such as a ball check valve which prevents a backflow of air once the balloon has been inflated. In addition, a means, such as a pin, is provided for manual insertion into the mouthpiece so as to deactivate the valve means to deflate the balloon when so intended.

In addition, the distress signal device has a light bulb mounted in the base within the confines of the balloon in a socket which is connected through a suitable electrical lead to an adapter, for example, a plug-in type, which can be inserted into an electrical socket in the dashboard of a vehicle. The distress signal device also includes a suitable mounting means on the bottom of the base for attaching the signal device to a surface such as an automobile roof.

In order to use the signal device the balloon is mounted over the base and held thereon by any suitable manually operated means, such as a spring clip. Next, the balloon is inflated orally through the mouthpiece. The inflated balloon and the base are then mounted on the top surface of a vehicle and the electrical adapter is plugged into a dashboard socket of the vehicle in order to light the bulb and illuminate the balloon from within. Due to the illumination of the interior of the balloon, the balloon can be seen for a relatively considerable distance during nighttime hours.

The signal device is utilized with different colored balloons for example, red, green and blue. Each balloon is used to indicate the type of needs required by the operator of the disabled vehicle. For example, a red balloon would indicate the need for medical aid, a green balloon would indicate the need for police aid and the blue balloon would indicate the need for fuel or mechanical aid. In this manner, the aid which is required by the disabled vehicle can be more quickly ascertained and dispatched to the point of disablement.

These and other objects and advantages of the invention will become more apparent from the following detailed description and appended claims taken in conjunction with the accompanying drawings in which:

FIG. 1 illustrates a perspective view of an illuminated distress signal device according to the invention on the roof of an automobile;

FIG. 2 illustrates a cross-sectional view of the distress signal device of FIG. 1 with the balloon in inflated condition;

FIG. 3 illustrates a view taken on line 3—3 of FIG. 2; and

FIG. 4 illustrates a cross-sectional view of the distress signal device with the balloon in a deflated condition.

Referring to FIG. 2, the distress signal device 10 includes a base 11, for example of a plastic material or other suitable inexpensive material such as wood, and a mounting means 12 such as a rubber suction cup which is cemented or otherwise secured to the bottom of the base 11. The base 11 has a peripheral groove 13 formed in the upper end thereof which receives the neck 14 of a balloon 15. The cross section of the base 11 at the portion adjacent the groove 13 can be of any suitable shape, for example, circular, rectangular or any other polygonal shape, in order to securely mount the balloon in place. In addition, a spring 16 is received over the neck 14 of the balloon 15 in the groove 13 to clamp the balloon 15 to the base 11. This spring 16 is constructed, for example, as a steel spring wire thumb clamp, such that the spring 16 can be manually opened by applying a squeezing force so as to permit removal of one balloon for replacement by another balloon in the groove 13.

The base 11 is further provided with a bore 17 which extends from the upper surface to a lower portion of the side of the base 11 in order to communicate the interior of the balloon 15 with the exterior of the base 11. In addition, a mouthpiece 18 is inserted into the base 11 in communication with the end of the bore 17. This mouthpiece 18 includes a valve means for preventing an inadvertent backflow of air upon inflation of the balloon 15. The valve means is constructed, for example, as a ball check valve and includes a ball 19 which is mounted in a bore 20 against a smaller counterbore 21. In order to retain the ball 19 within the bore 20, a retaining pin 22 is placed transversely of the mouthpiece 18 thus passing behind the ball 19 in the bore 20. The mouthpiece 18 thus permits a flow of air to be orally applied through the mouthpiece into the bore 17 of the base 11 so as to cause inflation of the balloon 15 mounted on the base 11 while also permitting the air pressure which builds up within the balloon to force the ball 19 across the exit of the counterbore 21 to retain the balloon 15 in inflated condition.

In order to deactivate the ball check valve, a pin 30 is passed into the smaller bore 21 of the mouthpiece 18 to push the ball 19 away from the bore 21. This allows the pressurized air in the balloon 15 to escape past the ball 19.

The base 11 also includes a light socket 22' in the top surface in which a light bulb 23 is mounted. The light socket 22' is connected via suitable electrical lead 24 to an adapter 25 at the end of the lead 24. This adapter 25 is suitably constructed as a plug-in adapter so as to fit into a socket in the dashboard of an automobile so that power can be supplied to the light bulb 23 from the battery of the automobile. The lead 24 is passed through a suitable bore 26 in the base 11 as well as through a suitable insulation cap 27 in the sidewall of the base 11. Alternatively, a pair of battery terminals (not shown) can be used instead of a plug-in adapter for attaching directly to a power source.

In order to use the distress signal device 10, a balloon of suitable color for indicating a particular disablement condition for a vehicle or driver of a vehicle is slipped over the top surface of the base 11 to envelop the light bulb 23. Thereafter, the spring 16 is opened and moved down the base 11 so that the neck 14 of the balloon 15 can be disposed over the groove 13. The spring 16 is then moved back into position over the groove 13 and released so that the balloon becomes locked into the groove 13 of the base 11. Next, a flow of air is directed through the mouthpiece 18 orally so that the balloon 15 is inflated to a suitable size. As shown in FIGS. 1 and 2, the signal device 10 with the inflated balloon 15 is then mounted on the roof of an automobile 28 by forcing the suction cup 12 into a suction engagement with the automobile 28. Thereafter, the adapter 25 is inserted into a suitable socket in the dashboard 29 of the automobile so as to illuminate the light bulb 23 within the balloon 15. In the event that the signal device is to be utilized during the daytime, it will, of course, not be necessary to illuminate the light bulb 23.

Referring to FIG. 4, after the signal device 10 has served its signalling purposes, the balloon 15 can be easily deflated by inserting the pin 30 into the counterbore 21 in order to push the ball 19 aside. This permits the air within the balloon to exit through the mouthpiece 18 as indicated by the arrows. The signal device 10 can then be removed from the roof of the automobile 28 by manually separating the suction cup 12 from the automobile.

By providing balloons of different colors for use with the signal device 10, it is possible to establish a code which would indicate the type of condition which has caused disablement of the vehicle or the operator of the vehicle. For example, a red balloon can be utilized to indicate that medical aid is needed for the operator or a passenger in the vehicle. Also, a green balloon could be used to indicate that there is need for police aid, for example, in a case of an accident involving another vehicle. Also, a blue balloon could be used to indicate the mechanical or fuel aid is necessary in order to place the vehicle in operating condition. The use of different colored balloons would thus clearly indicate during daylight hours the condition causing disablement. Further, by illuminating these balloons for nighttime conditions the same effect can be achieved without further modifications.

The invention thus provides a distress signal device which can be easily used and manipulated by an individual in order to signal his cause of distress. The signal device is of relatively compact dimensions, for example, the base may have overall dimensions of about 1½ inches at the bottom while standing approximately 2 inches high. In this manner, the signal device is of a portable compact hand held structure. The light bulb source can be a 6-to 12-volt bulb for proper cooperation with a battery of an automobile or other type of power source. Furthermore, the lead for the adapter can be, for example, 8 feet in length or longer to permit mounting of the balloon in a vantage point. The signal device can also be easily stored within the glove compartment of an automobile or within any other suitable space within a car or other vehicle.

The signal device is constructed of relatively simple components such that it can be easily and quickly manufactured at a relatively low cost. Furthermore, since the components are relatively simple, should any damage occur thereto, such can easily be repaired or replaced. Furthermore, all the components of the signal device can be cleaned or repaired from the outside of the device without any need to dismantle the device completely in order to repair or replace one component.

While the signal device of the invention has been described above with particularity to the use in automobiles, it is noted that it can also be used with boats and life rafts in similar fashion. In addition, it could also be used with aircraft, particularly small aircraft, in the event that the aircraft has been forced to land in wooded or otherwise inaccessible places.

It is also noted that the mounting means has been described above as being a suction cup. However, any suitable mounting means could be used and could be secured to the base in any suitable way such as by a bonding glue, threaded mechanical means, and the like.

Finally, it is noted that any suitable light source can be mounted in the base within the balloon to illuminate the balloon. For example, the light bulb can be powered by suitable batteries mounted within the base which are activated by a switch on the exterior of the base.

What is claimed is:

1. A portable distress signal device of compact hand held construction comprising
   a base having a top surface, a bottom and a bore communication said top surface of said base with another surface of said base;
   means on said bottom for mounting said base on a support means;
   a light bulb mounted in and projecting from and above said top surface of said base;
   a balloon secured about the periphery of said base over said top surface of said base about said light bulb with the interior thereof in communication with said bore;
   a mouthpiece mounted on said another surface of said base in communication with said bore for oral inflation of said balloon about said light bulb; and
   valve means in said mouthpiece for preventing a back flow of air under the pressure of the air in said balloon after inflation of said balloon.

2. A distress signal as set forth in claim 1 wherein said base includes a peripheral groove therein receiving a neck of said balloon and w0ich further comprises means for locking said neck of said balloon in said groove.

3. A distress signal as set forth in claim 2 wherein said means for locking is a spring clip.

4. A distress signal as set forth in claim 1 wherein said means for mounting said base is a suction cup.

5. A distress signal as set forth in claim 1 which further includes a lead connected to said light source and an adapter connected to the opposite end of said lead for connection to a power source.

6. A distress signal as set forth in claim 1 wherein said balloon is selectively colored to correspond to a predetermined code.

7. A distress signal device comprising
   a base having a bottom and a bore communicating one surface of said base with another surface;
   means on said bottom for mounting said base on a support surface;
   a balloon mounted over said one surface of said base with the interior thereof in communication with said bore;
   a mouthpiece mounted on said another surface of said base in communication with said bore for oral inflation of said balloon; and
   valve means in said mouthpiece for preventing a back flow of air under the pressure of the air in said balloon after inflation of said balloon, said valve means including a ball check valve having a first bore, a second bore of smaller size than said first bore in communication with said first bore, a ball mounted in said first bore adjacent said second bore and a retaining pin in said first bore on the opposite side of said ball from said second bore.

8. A distress signal as set forth in claim 7 further comprising a light source mounted in said base within said balloon for illuminating said balloon from within.

9. A distress signal as set forth in claim 7 which further includes a pin sized to pass into said second bore to move said ball away from said second bore.